US008812437B2

(12) United States Patent
Whitmyer, Jr.

(10) Patent No.: US 8,812,437 B2
(45) Date of Patent: *Aug. 19, 2014

(54) ONSITE BACKUP FOR THIRD PARTY INTERNET-BASED SYSTEMS

(71) Applicant: Wesley W. Whitmyer, Jr., Stamford, CT (US)

(72) Inventor: Wesley W. Whitmyer, Jr., Stamford, CT (US)

(73) Assignee: WhitServe LLC, Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,471

(22) Filed: May 24, 2013

(65) Prior Publication Data
US 2013/0262391 A1    Oct. 3, 2013

Related U.S. Application Data

(63) Continuation of application No. 13/157,134, filed on Jun. 9, 2011, which is a continuation of application No. 12/829,927, filed on Jul. 2, 2010, now Pat. No. 7,974,951, which is a continuation of application No. 12/620,158, filed on Nov. 17, 2009, which is a continuation of application No. 11/223,335, filed on Sep. 9, 2005, now Pat. No. 7,647,364, which is a continuation of application No. 09/706,651, filed on Nov. 6, 2000, now Pat. No. 6,981,007, which is a continuation-in-part of application No. 09/610,709, filed on Jul. 7, 2000, now abandoned.

(60) Provisional application No. 60/143,093, filed on Jul. 9, 1999.

(51) Int. Cl.
*G06F 17/30* (2006.01)
*G06Q 10/06* (2012.01)
*G06Q 30/04* (2012.01)
*G06F 11/14* (2006.01)

(52) U.S. Cl.
CPC .... *G06F 17/30315* (2013.01); *G06F 2201/875* (2013.01); *G06Q 10/06* (2013.01); *G06F 11/1469* (2013.01); *G06Q 30/04* (2013.01); *G06F 11/1464* (2013.01); *G06F 11/1456* (2013.01); *Y10S 707/99955* (2013.01)
USPC ........... 707/609; 707/610; 707/661; 707/674; 707/999.204

(58) Field of Classification Search
None
See application file for complete search history.

(56) References Cited

U.S. PATENT DOCUMENTS 5,410,646 A    4/1995    Tondevold et al.
5,634,052 A    5/1997    Morris
(Continued)

OTHER PUBLICATIONS

Microsoft—TechNet; "Accessing Heterogeneous Data with MS SQL Server 7.0"; Microsoft Corporation; http://technet.microsoft.com/en-us/library/cc917710(printer).aspx; (undated) 22 pages.

(Continued)

*Primary Examiner* — Hung Q Pham
(74) *Attorney, Agent, or Firm* — St. Onge Steward Johnston & Reens LLC

(57) ABSTRACT

A system for onsite backup of internet-based data is provided. The system includes a central computer, a client computer, a communications link between the central computer and the Internet, and a communications link between the client computer and the Internet. The system also includes at least one database containing a plurality of data records accessible by the central computer, each data record containing a client identification number. Software executing on the central computer receives a data backup request, and software executing on the central computer transmits the data backup to the client computer.

20 Claims, 3 Drawing Sheets

(56) References Cited

U.S. PATENT DOCUMENTS

| | | | |
|---|---|---|---|
| 5,649,196 | A | 7/1997 | Woodhill et al. |
| 5,673,318 | A | 9/1997 | Bellare et al. |
| 5,673,381 | A | 9/1997 | Huai et al. |
| 5,696,901 | A | 12/1997 | Konrad |
| 5,764,235 | A | 6/1998 | Hunt et al. |
| 5,771,354 | A | 6/1998 | Crawford |
| 5,812,398 | A | 9/1998 | Nielsen |
| 5,848,415 | A | 12/1998 | Guck |
| 5,870,759 | A | 2/1999 | Bauer et al. |
| 5,890,165 | A | 3/1999 | Boudrie et al. |
| 5,895,468 | A | 4/1999 | Whitmyer, Jr. |
| 5,901,228 | A | 5/1999 | Crawford |
| 5,903,881 | A | 5/1999 | Schrader et al. |
| 5,940,843 | A | 8/1999 | Zucknovich et al. |
| 5,940,845 | A | 8/1999 | Prager et al. |
| 5,956,733 | A | 9/1999 | Nakano et al. |
| 5,963,642 | A | 10/1999 | Goldstein |
| 6,003,044 | A | 12/1999 | Pongracz et al. |
| 6,032,119 | A | 2/2000 | Brown et al. |
| 6,035,307 | A | 3/2000 | Martin et al. |
| 6,049,801 | A | 4/2000 | Whitmyer, Jr. |
| 6,073,106 | A | 6/2000 | Rozen et al. |
| 6,076,167 | A | 6/2000 | Borza |
| 6,119,104 | A | 9/2000 | Brumbelow et al. |
| 6,119,118 | A | 9/2000 | Kain, III et al. |
| 6,236,996 | B1 | 5/2001 | Bapat et al. |
| 6,289,347 | B1 | 9/2001 | Giroux |
| 6,289,426 | B1 | 9/2001 | Maffezzoni et al. |
| 6,330,570 | B1 | 12/2001 | Crighton |
| 6,360,330 | B1 | 3/2002 | Mutalik et al. |
| 6,393,569 | B1 | 5/2002 | Orenshteyn |
| 6,411,943 | B1 | 6/2002 | Crawford |
| 6,453,325 | B1 | 9/2002 | Cabrera et al. |
| 6,457,012 | B1 | 9/2002 | Jatkowski |
| 6,487,561 | B1 | 11/2002 | Ofek et al. |
| 6,487,644 | B1 | 11/2002 | Huebsch et al. |
| 6,493,825 | B1 | 12/2002 | Blumenau et al. |
| 6,505,216 | B1 | 1/2003 | Schutzman et al. |
| 6,550,011 | B1 | 4/2003 | Sims, III |
| 6,571,280 | B1 | 5/2003 | Hubacher |
| 6,574,733 | B1 | 6/2003 | Langford |
| 6,615,327 | B1 | 9/2003 | Satoyama et al. |
| 6,615,349 | B1 | 9/2003 | Hair |
| 6,651,142 | B1 | 11/2003 | Gorelik et al. |
| 6,778,668 | B1 | 8/2004 | Nielsen |
| 6,785,786 | B1 | 8/2004 | Gold et al. |
| 6,880,008 | B1 | 4/2005 | Yoneda |
| 6,883,110 | B1 | 4/2005 | Goddard |
| 6,912,629 | B1 | 6/2005 | West et al. |
| 6,938,057 | B2 | 8/2005 | Gusler et al. |
| 6,981,007 | B1 | 12/2005 | Whitmyer, Jr. |
| 7,069,466 | B2 | 6/2006 | Trimmer et al. |
| 2002/0107877 | A1 | 8/2002 | Whiting et al. |
| 2004/0034811 | A1 | 2/2004 | Trimmer et al. |
| 2006/0053147 | A1 | 3/2006 | Wahlert et al. |

OTHER PUBLICATIONS

William Martiner, et al.; "Building Distributed Applications with ADO"; copyright © 1999; Published by John Wiley & Sons, Inc.; Specific pp. 73-75, 89, 91-112, and 159-196.

Chapter 5—Fundamentals of SQL Server Architecture; © 2013 Microsoft. All rights reserved. Revtrieved via Internet—<URL> http://technet.microsoft.com/en-us/library/cc917541.aspx; 3 pages.

Petitioner's Exhibit List No. GOOG-1005; Copyright Record for Customers.com: How to Create a Profitable Business Strategy for the Internet and Beyond by Patricia B. Seybold from the United States Copyright Office; 1 page; Record retrieved Mar. 22, 2013.

Petitioners Exhibit List No. GOOG-1004; Customers.com: How to Create a Profitable Business Strategy for the Internet and Beyond; by Patricia B. Seybold; 25 pages. 1998.

Data Protection Services, LLC—Secure Online Backup—www.dataprotection.com—1996, pp. 1-4.

Petitioner's Exhibit List No. GOOD-1009; Declaration of William S. Finkelstein; Executed: Apr. 15, 2013; 74 pages.

Microsoft—TechNet; "Fundamentals of SQL Server Architecture"; Microsoft Corporation; http://technet.microsoft.com/en-us/library/cc917569(printer).aspx; (undated) 2 pages.

Microsoft® Programming Series; Hitchhiker's Guide to Visual Basic and SQL Server—Sixth Edition; William R. Vaughn; Published by Microsoft Press; Copyright © 1998; Specific pp. 563, 568, 572, and 623.

Phillips, "Internet Fax 101—An Introduction to the Issues, Products and Services of This Money-Saving Technology"; Published in BTA Solutions Magazine, Jul. 1997; 6 pages; Retrieved from Internet via <URL> http://www.tech-write.biz/docs/tw_a11.pdf.

Storage Technology Corporation, "L700 Tape Library General Information Manual"; Copyright 1999, Storage Technology Corporation.

Microsoft—TechNet; "Managing Clients"; Microsoft Corporation; http://technet.microsoft.com/en-us/library/cc917567(printer).aspx; (undated) 13 pages.

Microsoft—TechNet; "Managing Security"; Microsoft Corporation; http://technet.microsoft.com/en-us/library/cc917569(printer).aspx; (undated) 29 pages.

Microsoft—TechNet; "Managing Servers"; Microsoft Corporation; http://msdn.microsoft.com/en-us/library/cc917566(printer).aspx; (undated) 32 pages.

Microsoft SQL Server 7 Technical Articles; "Microsoft SQL Server 7.0 Query Processor"; Microsoft Corporation http://msdn.microsoft.com/en-us/library/aa226170(SQL.70,printer).aspx; Sep. 1998; 17 pages.

Microsoft SQL Server 7 Technical Articles; "Microsoft SQL Server 7.0 Replication Made Easy"; Microsoft Corporation http://msdn.microsoft.com/en-us/library/aa226171(SQL.70,printer).aspx; Jun. 8, 1999; 3 pages.

Microsoft SQL Server 7 Technical Articles; "Microsoft SQL Server 7.0 Security"; Microsoft Corporation http://msdn.microsoft.com/en-us/library/aa226173(SQL.70,printer).aspx; May 1998; 34 pages.

Petitioner's (Google Inc) Exhibit List; Apr. 15, 2013; 1 page.

Petition for Inter Partes Review by Google Inc (Petitioner). Dated Apr. 15, 2013; 63 Pages (Including Certificate of Service by Andrew S. Ehmke Dated Apr. 15, 2013).

Microsoft SQL Server 7 Technical Articles; "Replication for Microsoft SQL Server Version 7.0"; Microsoft Corporation http://msdn.microsoft.com/en-us/library/aa226168(SQL.70,printer).aspx; Jul. 11, 1998; 13 pages.

Goog-1003 On Petitioner's Exhibit List—Screen Captures of wellsfargo.com dated: Oct. 11, 2012; 18 pages total.

Microsoft—TechNet; "Things to Consider When Building Commerce Solutions with Technologies"; Microsoft Corporation; http://technet.microsoft.com/en-us/library/bb687375(printer).aspx; Aug. 1999; 53 pages.

WhitServe Preliminary Response to Google IPR request; Dated: Jul. 18, 2013. 124 pages.

Petitioner's Exhibit List No. GOOG-1008; *Whitserve, LLC et al.* v. *Computer Pack, Inc.*, 694 F.3d 10 (Fed. Cit. 2012); 54 pages.

Floppy Disk, Wikipedia, Sep. 3, 2013 <http://en.wikipedia.org/wiki/Fioppy_disk.

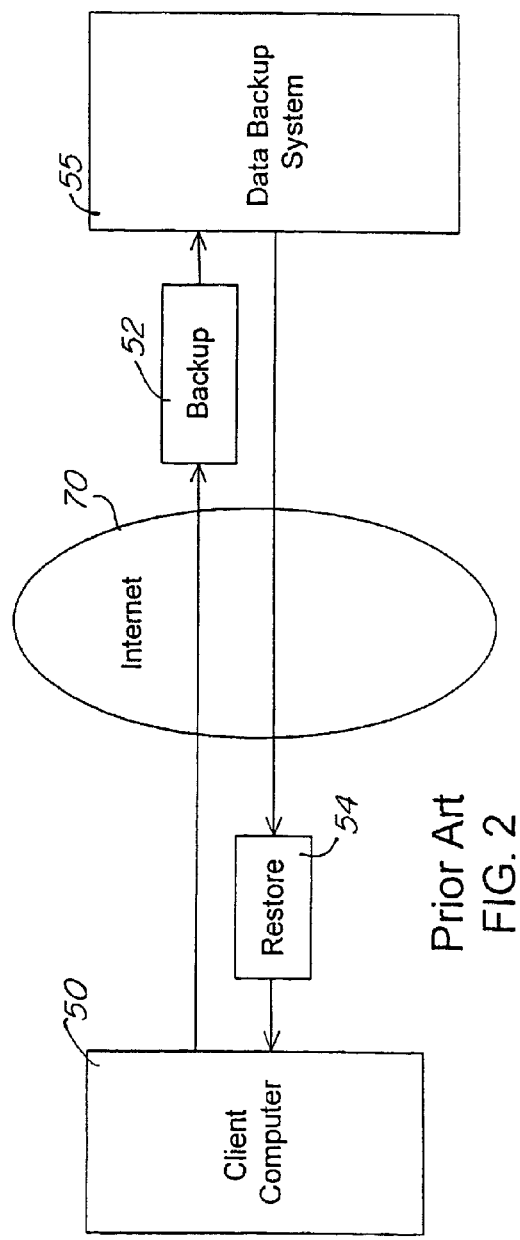
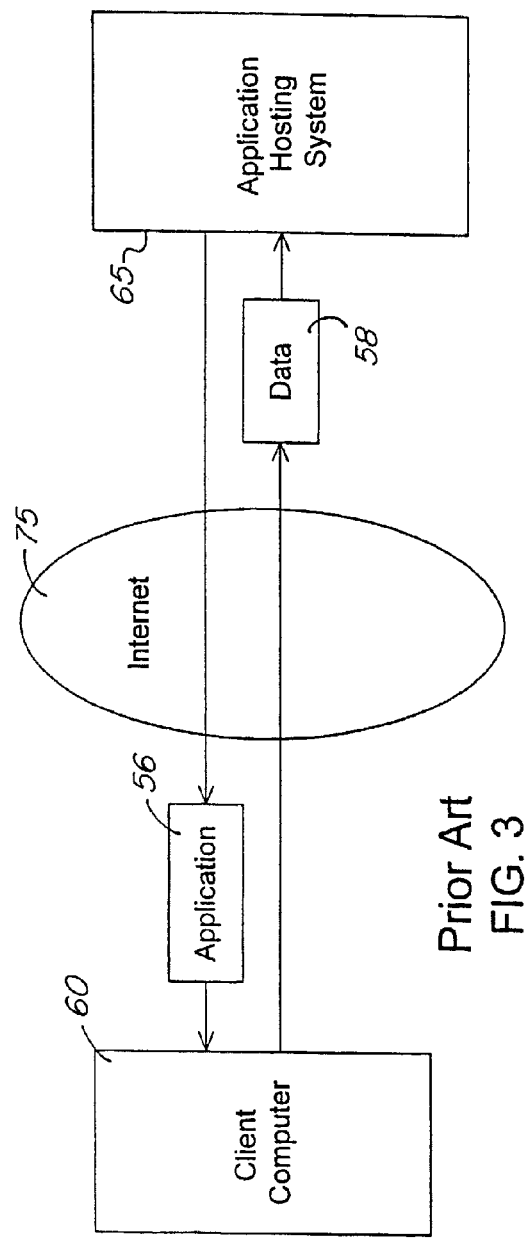

US 8,812,437 B2

ONSITE BACKUP FOR THIRD PARTY INTERNET-BASED SYSTEMS

FIELD OF THE INVENTION

The invention relates to outsourced, Internet-based data processing and more particularly to safeguarding customer/client data when a business outsources data processing to third party Internet-based systems.

BACKGROUND OF THE INVENTION

In an effort to improve customer service, companies are increasingly moving their data processing systems onto the Internet and providing web interfaces for their customers to see and manipulate their own data. Examples include my prior U.S. Pat. No. 5,895,468 and related U.S. application Ser. No. 09/237,521 (now U.S. Pat. No. 6,049,801). Many other Internet based order entry and payment billing systems also exist.

Also companies are or soon will be outsourcing data processing for their own customers to third parties who, for example, develop and host the companies' web sites. This cuts costs and relieves companies of having to hire software expertise to service their customers and also relieves them of having to maintain hardware for scalability and to prevent service outages which erode customer confidence in the company. Further, hardware can be located in one place to minimize maintenance and bandwidth costs, while software and data entry can be located in one or multiple places where it is least expensive and can offer 24/7 coverage.

One difficulty companies face when considering whether to outsource data-processing to third party, Internet-based systems is the safeguarding of their and their clients' data. This problem is exacerbated when the company has a duty or professional responsibility to safeguard the data, such as a publicly traded company, law firm or medical practice. Another difficulty companies face in considering to outsource is continuity of service if, for example, the third party were to go out of business.

Many companies who currently perform their own data processing and are sensitized to the need to safeguard their and their customers' data have recently connected their LANs to the Internet, and are beginning to use third-party, Internet-based backup services (see FIG. 2). This provides a prudent off-site backup but does not offer the benefits of outsourcing the data processing to the Internet. Internet data backup companies include, inter alia, and Storage Tek.

Internet-based application service providers, so-called "ASPs" are known and provide the advantage that hardware and software maintenance and upgrades are centrally managed by a third party and not by each user or each LAN (see FIG. 3). User data may even be stored on the internet site, however, the data is still entered and manipulated by each user on his LAN/computer and the data manipulation and reporting is handled by each user on his LAN/computer.

What is desired, therefore, is an Internet-based data processing system which safeguards data providing an incentive for companies to outsource their data processing. Safeguarding applications, and especially any user customized settings, would also be desirable.

SUMMARY OF THE INVENTION

It is an object of the invention to safeguard the integrity of client data in an Internet-based data processing system or business.

Another object of the invention is to provide third party Internet-based data processing in which clients have access to and control over their own data.

A further object of the invention is to provide an Internet-based data processing system in which clients can obtain a copy of their data for on-site backup.

Yet another object of the invention is to provide a system of the above character in which the backup is provided in a format other than that used by the third party data processing system.

Yet a further object of the invention is to provide a system of the above character in which the data is encrypted to protect its confidentiality.

Still another object of the invention is to safeguard the third-party data processing software for use by the client in the event the third party were to go out of business.

These and other objects and advantages will become more apparent from the following detailed description considered with reference to the accompanying drawings.

BRIEF DESCRIPTION OF THE DRAWINGS

FIG. 2 is a block diagram of prior art systems providing Internet backup for data processing on clients' sites.

FIG. 3 is a block diagram of prior art systems providing Internet hosting of application and storage of data.

DETAILED DESCRIPTION OF THE INVENTION

Figure 1:
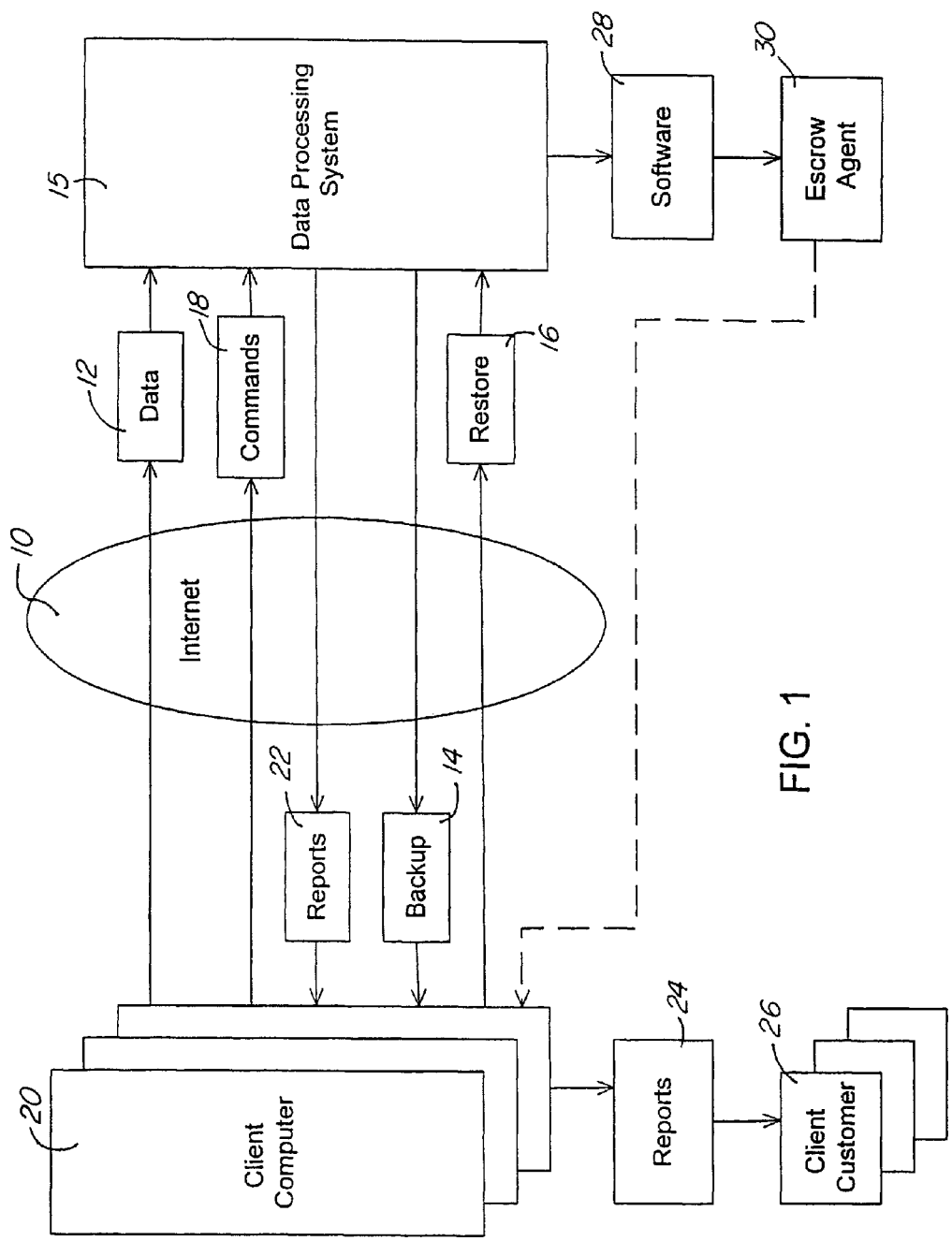
FIG. 1 is a block diagram of an Internet-based data processing system providing backup on clients' sites.

FIG. 1 is a block diagram of an Internet-based data processing system providing backup on clients' sites. The client computer 20 and data processing system 15 are connected by an Internet communications link 10. The client computer 20 executes software (FIG. 4 No. 38), residing on the data processing system 15, for storing data on the data processing system. The client computer 20 executes software, residing on the data processing system 15, for displaying, updating, and deleting data 12 stored on the central data processing system 15. The data processing system 15 transmits 14 a copy of stored data to the client computer 20. The client computer 20 issues commands 18 for transmitting (restoring) data 16 back to the data processing system 15. The client computer 20 executes software (FIG. 4 No. 38), residing on the data processing system 15, requesting reports from the data processing system 15. The data processing system 15 transmits reports 22 to the client computer 20. The client computer can generate reports 24 and transmit said generated reports to a client customer 26.

FIG. 2 is a block diagram of prior art systems providing Internet backup for data processing on clients' sites. The client computer 50 and data backup system 55 are connected by an Internet communications link 70. Data displayed, manipulated, and deleted (not shown) by the client computer 50 is stored on the client computer 50. The client computer 50 executes software for transmitting a copy of data 52 to the data backup system 55. The client computer executes software for retrieving data 54 stored on the data backup system 55. There is no onsite backup of data for the client computer 50 to retrieve.

FIG. 3 is a block diagram of prior art systems providing Internet hosting of application and storage of data. The client computer 60 and application hosting system 65 are connected by an Internet communications link 75. Data displayed, manipulated, and deleted (not shown) by the client computer 60 is stored on the application hosting system 65. There is no onsite backup of data for the client computer 60 to access.

Figure 4:
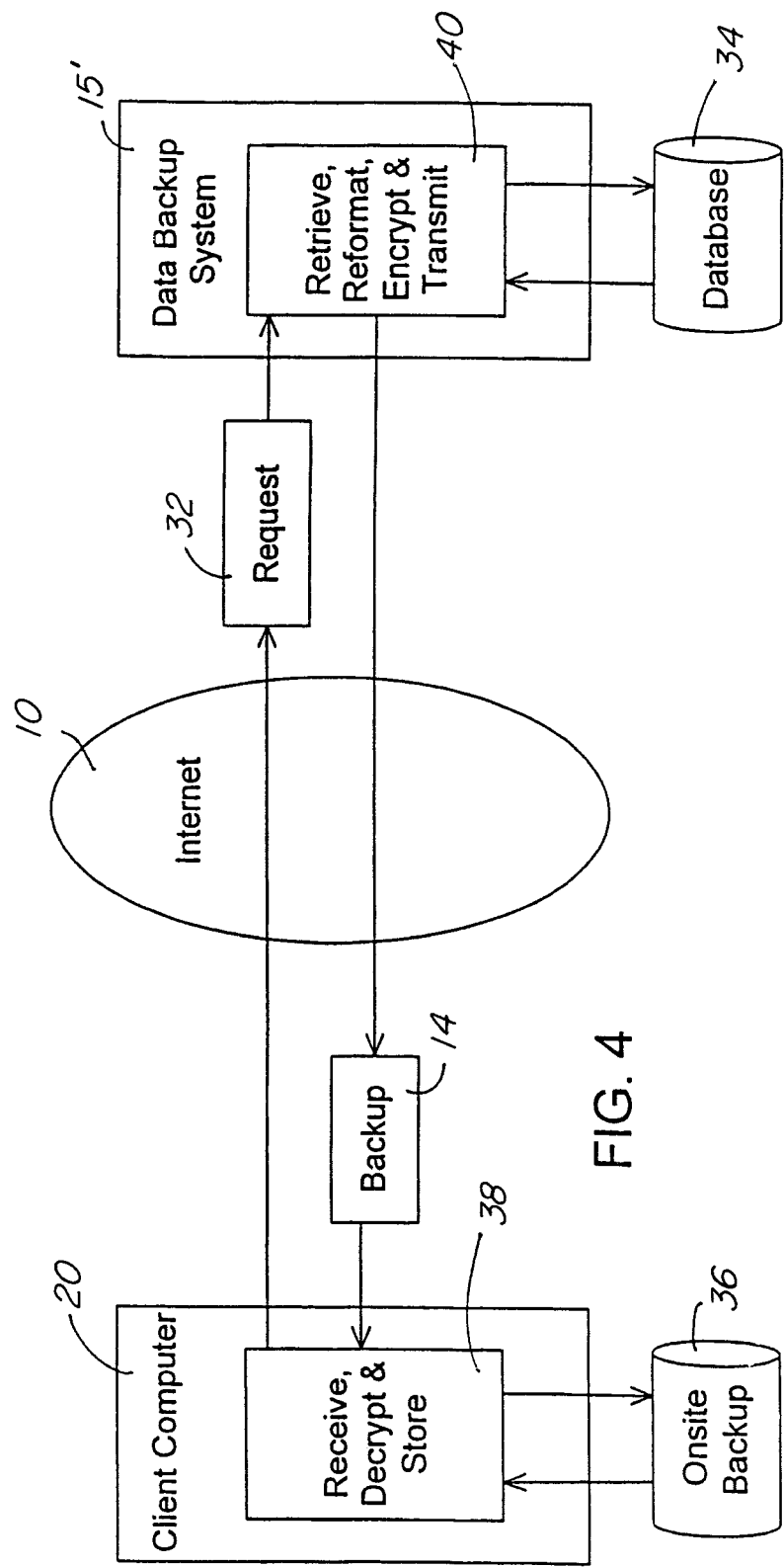
FIG. 4 is a block diagram of the system of FIG. 1 illustrating additional format conversion and encryption features.

FIG. 4 is a block diagram of the system of FIG. 1 illustrating additional format conversion and encryption features. This additional feature allows a client to back-up data on-site that is securely stored in a plurality of formats the client may require. The client computer 20 transmits a request 32 to the data backup system 15'. The data backup system 15' accesses data (stored on the data backup system 34), reformats the data, encrypts the data, and transmits the data 40, 14 to the client computer 20. The client computer 20 receives, decrypts, and stores 38 the data onsite 36.

It is to be understood that although specific embodiments of the invention have been described herein in detail, such description is for purposes of illustration only and modifications may be made thereto by those skilled in the art within the scope of the invention.

What is claimed is:

1. A system for onsite backup for third party internet-based data processing systems, comprising:
   a central computer managed by a third party and accessible by at least one client computer at a client site via the Internet for outsourced data processing;
   at least one database containing a plurality of data records accessible by said central computer, the data records including internet-based data modifiable over the Internet from the at least one client computer;
   a plurality of client identifiers, wherein each of the plurality of data records is associated with at least one of said client identifiers;
   data processing software executing on said central computer and managed by the third party for outsourcing data processing to the Internet from the at least one client computer, said data processing software displaying, updating and deleting the internet-based data in the plurality of data records according to instructions received over the Internet from the at least one client computer;
   software executing on said central computer to receive, via the Internet from the at least one client computer, a request for a backup copy of at least one of the plurality of data records including the internet-based data in the at least one of the plurality of data records that has been updated or deleted by said data processing software; and
   software executing on said central computer to transmit the backup copy of the at least one of the plurality of data records including the internet-based data in the at least one of the plurality of data records that has been updated or deleted by said data processing software to the client site for storage of the internet-based data from the at least one of the plurality of data records in an onsite location accessible via the at least one client computer.

2. The system according to claim 1, wherein a client's access to said central computer and said at least one database is limited to the client's own data by at least one of said plurality of client identifiers.

3. The system according to claim 1, further comprising software executing on said central computer to reformat the at least one data record, wherein the backup copy of the at least one data record is sent to the client site in one of a plurality of formats required by the client.

4. The system according to claim 1, wherein the onsite location is accessible via the at least one client computer without using the Internet.

5. The system according to claim 1, wherein said central computer is located at a place different than the client site where said at least one client computer is located.

6. The system according to claim 1, wherein maintenance and upgrades to said central computer are performed by the third party and not by clients.

7. The system according to claim 6, wherein said central computer is located at a site of the third party.

8. The system according to claim 1, further comprising a web interface for accessing the plurality of data records via the Internet from said client computer, wherein the request for the backup copy is received via said web interface.

9. The system according to claim 1, wherein the backup copy of the at least one data record is securely sent to the client site using one or more encryption features.

10. A system for onsite backup for internet-based data processing systems, comprising:
    a central computer accessible by at least one client computer at a client site via the Internet for outsourced data processing;
    at least one database containing a plurality of data records accessible by said central computer, the plurality of data records including internet-based data that is modifiable over the Internet from the client computer;
    data processing software executing on said central computer for outsourcing data processing to the Internet from the at least one client computer, said data processing software modifying the internet-based data in the plurality of data records according to instructions received from the at least one client computer, the modifying including updating and deleting the internet-based data in the plurality of data records;
    a client data request, sent from at least one client computer via the Internet to said central computer, the client data request comprising a request for a backup copy of at least one of the plurality of data records;
    software executing on said central computer to receive, via the Internet from the at least one client computer, the request for a backup copy of at least one of the plurality of data records including the internet-based data in the at least one of the plurality of data records that has been modified by said data processing software; and
    software executing on said central computer to transmit the backup copy of the at least one of the plurality of data record including the internet-based data in the at least one of the plurality of data records that has been modified by said data processing software to the client site for storage of the internet-based data from the at least one of the plurality of data record in a location accessible via the at least one client computer;
    wherein the location is accessible by the at least one client computer without using the Internet.

11. The system according to claim 10, wherein a client's access to said central computer and said at least one storage is limited to the client's own data.

12. The system according to claim 10, wherein maintenance and upgrades to said central computer are performed by a third party and not by clients.

13. The system according to claim 10, wherein said central computer is located at a place different than the client site where said at least one client computer is located.

14. The system according to claim 13, wherein said central computer is located at a site of a third party.

15. The system according to claim 10, wherein said at least one storage is managed by a third party.

16. The system according to claim 10, further comprising a web interface for accessing the plurality of client data records via the Internet from the at least one client computer, wherein said client data request is sent via said web interface.

17. The system according to claim 10, wherein the backup copy of said client data is securely sent to the client site using one or more encryption features.

18. The system according to claim 10, wherein the backup copy of said client data is sent to the client site in one of a plurality of formats required by the client.

19. A non-transient computer readable medium containing software executed by at least one processor for causing a central computer to perform the following steps:

storing a plurality of data records in a database accessible by said central computer, the data records including internet-based data modifiable over the Internet by at least one of a plurality of users for outsourced data processing the database further including a plurality of client identifiers, wherein each of the plurality of data records is associated with at least one of said client identifiers;

modifying the internet-based data in at least one of the plurality of data records according to commands received over the Internet from the at least one of the plurality of users, the modifying including updating and deleting the internet-based data in the at least one of the plurality of data records;

receiving, via the Internet from the at least one of the plurality of users, a request for a backup copy of the at least one of the plurality of data records including the internet-based data in the at least one of the plurality of data records that has been modified by said data processing software; and transmitting the backup copy of the at least one of the plurality of data records including the internet-based data in the at least one of the plurality of data records that has been modified by said data processing software to the at least one of the plurality of users for local download and storage of the internet-based data from the at least one of the plurality of data records by the at least one of the plurality of users.

20. The computer readable medium according to claim 19, the software further causing the central computer to generate a web interface for accessing the plurality of data records via the Internet from at least one user computer, wherein the request is sent via said web interface.

\* \* \* \* \*